Nov. 26, 1946.  J. B. MALIN  2,411,740
INTERNAL-COMBUSTION ENGINE
Filed Dec. 22, 1943  3 Sheets-Sheet 1
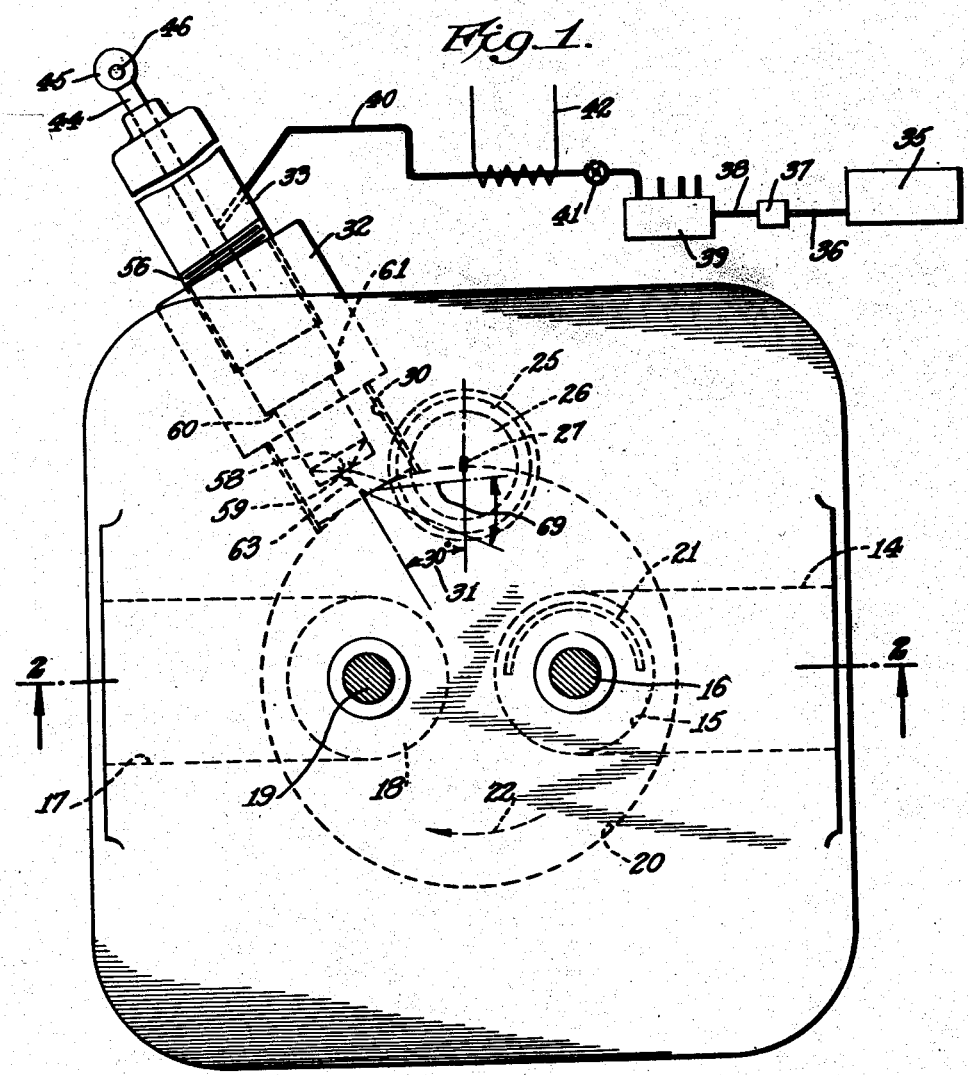
INVENTOR.
JAY B. MALIN
BY
ATTORNEY

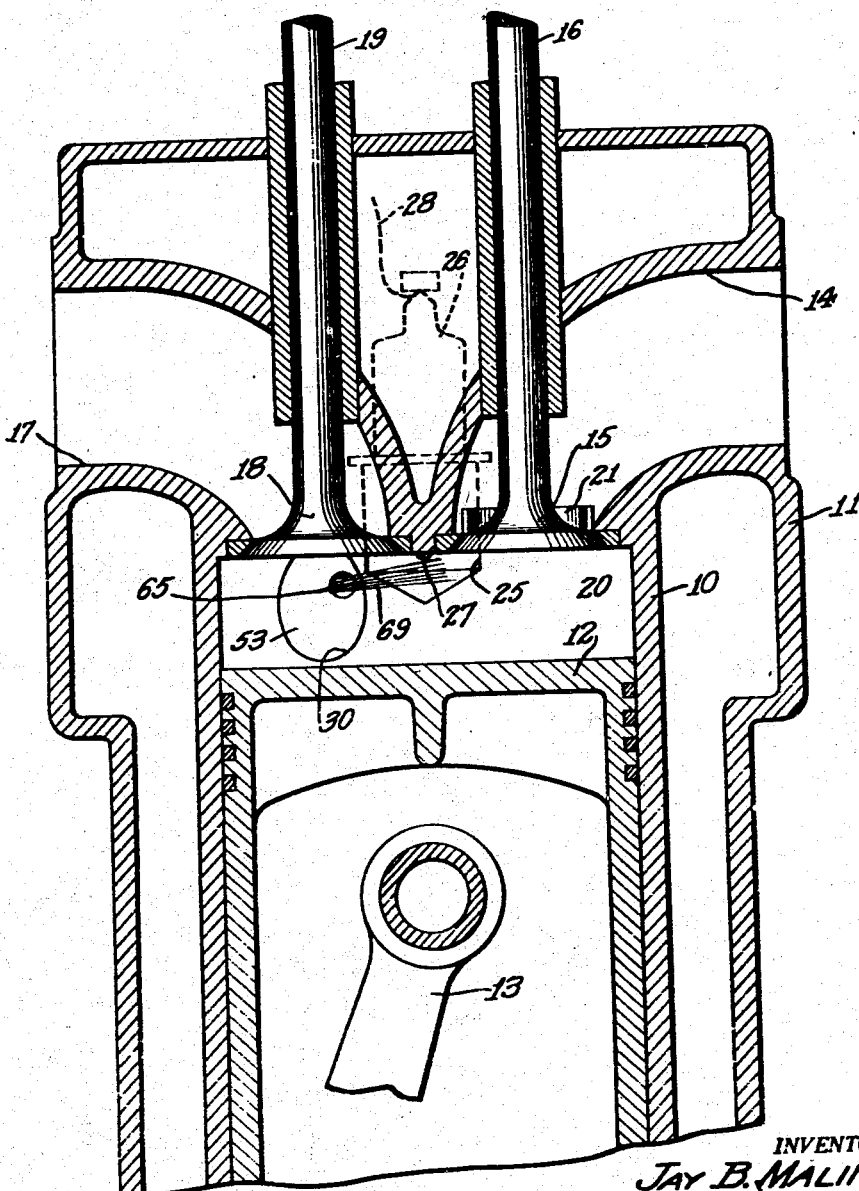

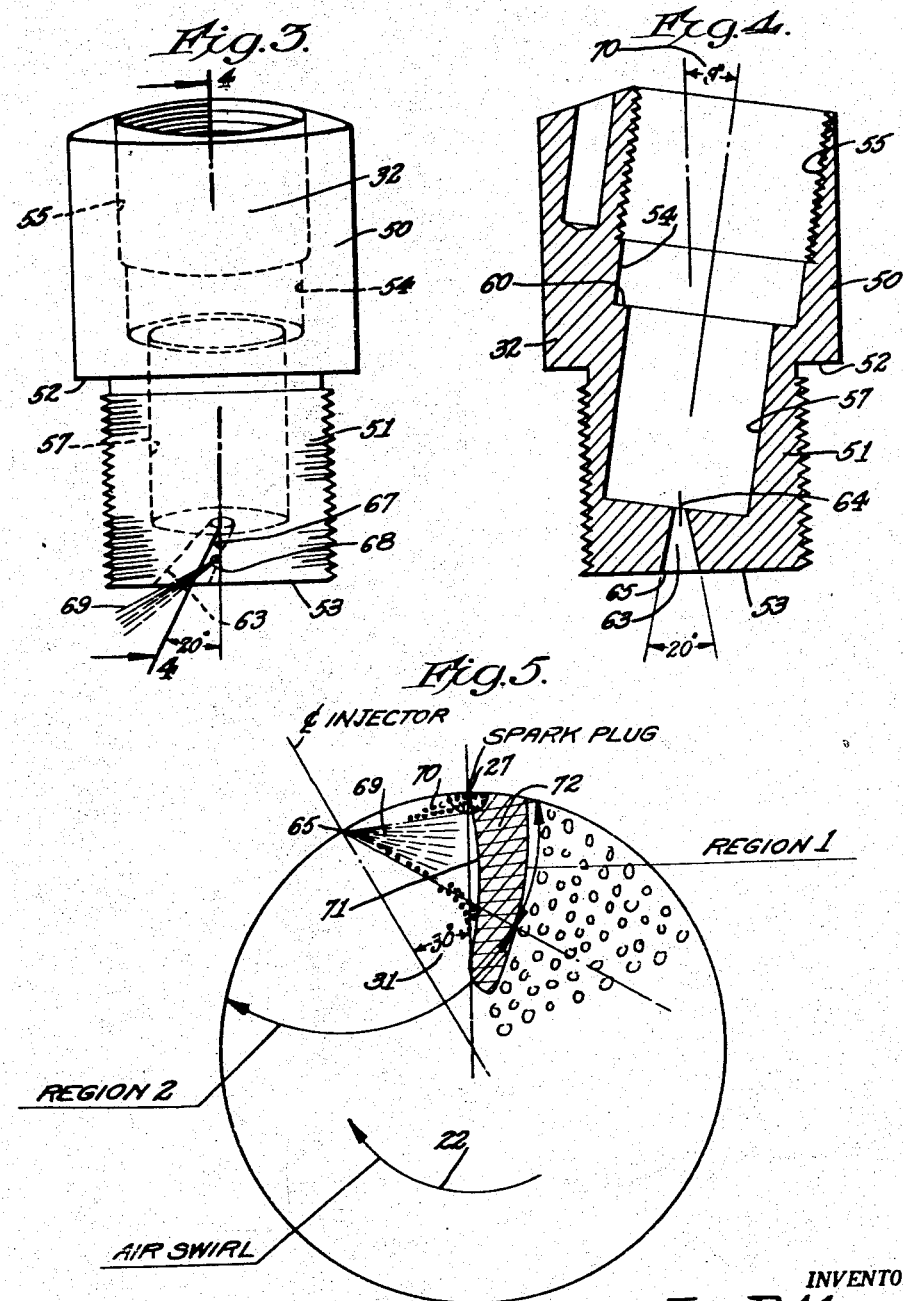

Patented Nov. 26, 1946

2,411,740

UNITED STATES PATENT OFFICE 2,411,740

INTERNAL-COMBUSTION ENGINE

Jay B. Malin, Fishkill, N. Y., assignor, by mesne assignments, to The Texas Company, New York, N. Y., a corporation of Delaware Application December 22, 1943, Serial No. 515,234

8 Claims. (Cl. 123—32)

1

This invention relates to an internal combustion engine of the fuel-injection spark-ignition type and to a method of operating such an engine.

In the copending application of Everett M. Barber, Serial No. 513,232, filed December 7, 1943, as a continuation-in-part of Serial No. 463,031, filed October 23, 1942, there is disclosed and claimed an internal combustion engine of this type and a method of operating such an engine, whereby spontaneous ignition of the fuel mixture and knocking of the engine are eliminated irrespective of the octane value and cetane value of the fuel employed, and irrespective of the compression ratio of the engine and the charge density used. This is accomplished by preventing sufficient fuel from mixing with that portion of the air within the combustion space which would normally form the so-called "end gas," meaning unburned combustible fuel vapor-air mixture trapped by the flame front following ignition, so that spontaneous ignition of the mixture cannot take place and knocking of the engine is not possible.

In a preferred embodiment of that invention, air is introduced into the combustion space of the engine in a manner to produce a high velocity of swirling movement therein, this air is compressed while maintaining the swirling movement, and near the end of the compression stroke fuel is injected into the compressed swirling air in a manner to provide knock-free combustion. The latter is effected by injecting the fuel at such a temperature and pressure that at least a part of the fuel flash vaporizes or forms vapor very rapidly, and this vapor mixes with the swirling air to produce a combustible fuel vapor-air mixture with only a short travel from the locus of injection. The first increment of injected fuel is spark ignited substantially as soon as the combustible mixture has been formed, and before sufficient fuel has been introduced to produce knock. The immediate ignition of this first increment of injected fuel establishes a flame front; and the injection of fuel is continued during the balance of the injection period into a narrow zone or zones of the combustion space immediately in advance of the flame front in its direction of burning, whereby the remaining injected fuel mixes with additional swirling air to rapidly form combustible fuel vapor-air mixture that is consumed by combustion substantially as rapidly as formed. The net result is that any combustible fuel-air mixture undergoing combustion within the cylinder is so rapidly consumed after formation that

2 it is, at all times, cushioned by a mass of incombustible gas, either air or products of combustion or both. Consequently, the accumulation of any substantial amount of highly compressed and heated end gases consisting of unburned combustible fuel-air mixture is avoided, and knocking of the engine cannot occur.

In the preferred embodiment mentioned above, the fuel is injected in a generally tangential direction of the combustion space in the direction of air swirl, and in the form of a highly atomized diffused spray of low intensity. Many of the conventional fuel injection nozzles on the market are not capable of producing the desired type of highly atomized soft spray, but rather form a more or less solid jet of high intensity. Moreover, in order to mount the fuel injection nozzle so as to discharge in a generally tangential direction of the combustion space, the cylinder wall must be drilled with a bore passing through the wall in a non-radial direction, which may involve certain difficulties in construction and considerations of structural strength, strains, and the formation of a gas-tight seal. Moreover, many conventional engines which are otherwise adaptable to conversion to this method of knock-free combustion, are equipped with radially drilled holes which are not susceptible to the proper mounting of the injection nozzle in the desired tangential relationship.

One of the principal objects of the present invention is to overcome the above-mentioned difficulties and to provide for the ready and economical conversion of available engines and conventional fuel injection nozzles to this method of knock-free combustion.

Another object of the present invention is to provide an adapter for conveniently and economically mounting a fuel injection nozzle on an engine cylinder to produce by impingement a desired atomized soft spray of proper intensity and dispersion and of proper direction in the combustion space, to achieve this method of knock-free combustion.

Still another object of the invention is to provide a method of and apparatus for carrying out combustion without knocking in a fuel-injection spark-ignition internal combustion engine, wherein the fuel jet from the nozzle is formed into the desired spray pattern by impingement while being simultaneously heated for rapid vaporization, and contact of liquid fuel particles with metal parts of the cylinder wall, piston and spark plug electrodes is at the same time avoided.

Other objects and advantages of the invention will be apparent from the following description when taken in conjunction with the attached drawings and appended claims.

In the drawings, which illustrate a preferred embodiment of the invention,

Fig. 1 is a plan view of an engine cylinder, with appurtenances including the fuel injection system and controls illustrated diagrammatically;

Fig. 2 is a vertical sectional view taken on the plane of the line 2—2 of Fig. 1;

Fig. 3 is a perspective view of the adapter;

Fig. 4 is a vertical sectional view of the adapter taken on the plane of the line 4—4 of Fig. 3; and Fig. 5 is a diagrammatic plan view of the engine cylinder combustion space, illustrating the type of combustion occurring therein.

Referring more particularly to Figs. 1 and 2, the engine cylinder is indicated at 10 having the usual water jacket 11, with piston 12 and connecting rod 13 which runs to the usual crank shaft (not shown). The cylinder head is equipped with an intake port 14 communicating with a conventional air intake pipe or manifold which may contain a customary air filter (not shown). Port 14 is controlled by a poppet intake valve 15 having a valve stem 16 extending through the head to the exterior thereof. The cylinder head is also provided with an exhaust port 17 communicating with a conventional exhaust pipe which may contain a suitable muffler (not shown). The exhaust port is controlled by a poppet valve 18 having a valve stem 19 also extending through the head. It will be understood that the valve stems 16 and 19 are actuated in customary manner by suitable cams carried by a conventional valve cam shaft (not shown) driven at one-half the engine speed for four-cycle operation.

As shown, a disc-shaped combustion space 20 is formed within the engine cylinder, which is circular in cross-section. While the piston and cylinder head are shown in Fig. 2 as being flat, one or more may be dished or crowned. It is to be understood that the term "disc-shaped" is used in a broad sense as meaning a combustion space which is generally circular in cross-section, but which may have various configurations in vertical section due to dishing or crowning of the piston or cylinder head or both. The intake valve 15 is equipped with a shroud 21 shown as extending approximately 180° about the valve, the ends of the shroud being positioned substantially on a radius of the combustion space (Fig. 1). The air intake opening of the valve is thus tangential to thereby impart a high velocity of swirling movement to the air introduced into the combustion space in the direction of the arrow 22. While the 180° shroud in the position shown constitutes a preferred arrangement, it is to be understood that the angular extent of the shroud and the setting of the shroud with respect to the true tangential position can be altered somewhat to secure different velocities of air swirl, so long as the spray pattern, rate of fuel injection and positioning of the fuel injection opening with reference to the locus of spark ignition are properly coordinated with the air swirl velocity in a manner more fully described below. Moreover, the induction air swirl can also be secured by arranging the air intake port 14 so as to be generally tangential to the combustion space, in place of the shrouded valve construction illustrated.

The cylinder head is equipped with a threaded socket 25 adapted to receive a spark plug 26 so that the electrodes 27 of the plug are positioned substantially at the circumference and at the upper end of the combustion space 20. The socket 25 provides a slight semicircular indentation in the wall of the combustion space, the electrodes 27 being at the center of this indentation and approximately on the imaginary line constituting a continuance of the circumference of the combustion space as viewed in Fig. 1. The electrodes 27 extend down into this socket 25 so that the ends of the electrodes are just below the horizontal plane of the upper end of the combustion space as viewed in Fig. 2. It will be understood that spark plug 26 is connected by wire 28 in a conventional ignition system (not shown) which is timed in synchronization with the engine cycle to produce a spark of ignitible intensity at the electrodes 27 at the proper period of the cycle.

The cylinder is also equipped with a threaded bore 30 drilled on a radius of the cylinder combustion space (Fig. 1), the included angle 31 between the radii intersecting the center of bore 30 and the electrodes 27 respectively being shown as approximately 30°, although this may be varied as hereinafter described. In accordance with the present invention, an adapter 32 (Figs. 3 and 4) is mounted within bore 30 and receives a fuel injection nozzle 33. Fuel from a suitable source of supply such as tank 35 is drawn through line 36 by fuel pump 37 driven by the engine in any conventional manner. The fuel pump forces the liquid or liquefied fuel under pressure of about 500–4000 lbs. per square inch through line 38 into an accumulating tank 39, from which it passes by line 40 leading to the injection nozzle 33. Line 40 contains a check valve 41 and may be equipped with a suitable heating means, shown as an electrical heating coil 42. While any conventional fuel injection system can be employed, the one shown is of particular adaptation to multi-cylinder engines, since the separate cylinders and their respective injection nozzles can be supplied through individual lines 40 running from the accumulator tank 39.

Any suitable and conventional means for regulating the quantity of fuel injected and the time of fuel injection in relation to the engine cycle can be employed. As diagrammatically illustrated, the injection nozzle 33 is equipped with a spring actuated valve 44 having a valve stem operated by cam 45 carried by cam shaft 46, which is interconnected to be driven by the engine at half the engine speed in any conventional manner. Cam 45 may be adjusted relative to the piston stroke to control the time of fuel injection or injection advance, and adjusted relative to the valve stem to control the length of time of opening of the valve 44 to control the rate of fuel injection and the amount of fuel injected on each stroke. As controls for this purpose are conventional and well-known, no further illustration thereof is deemed necessary. It is to be understood that the quantity and rate of fuel injection and the injection advance can be controlled by a cam-operated plunger-type fuel pump cooperating with a pressure-operated check valve in the injection nozzle in conventional manner, instead of the arrangement described above.

The adapter 32 is preferably formed of good heat absorbing and conducting material, such as brass. This adapter comprises a body portion 50 of larger external diameter and a threaded extension 51 of smaller diameter adapted to be received in gas tight relationship in the threaded bore 30. An external shoulder 52 limits threaded insertion of the adapter into the bore 30, so that the end wall 53 of the extension is substantially flush with the circumference of the combustion space 20. The body portion 50 is formed with an enlarged socket portion 54, the outer end of which has internal screw threads 55 adapted to receive an externally threaded portion 56 of fuel injection nozzle 33 in gas-tight relationship. Extension 51 is formed with a socket portion 57 of smaller internal diameter adapted to receive the nozzle tip 58 which is provided with the usual injection port 59 at the end thereof. An internal shoulder 60 limits threaded engagement of nozzle 33 within threads 55 by virtue of cooperating shoulder 61 on the nozzle, so that the injection port 59 is close to and positioned rearwardly of the interior of end wall 53.

A bore 63 is drilled through the end wall 53, this bore flaring outwardly from a smaller diameter opening 64 facing the fuel injection port 59 in the nozzle tip 58, to a larger diameter port 65 at the outer surface of end wall 53. As shown particularly in Fig. 3, the center line of bore 63 is inclined with respect to the central axis of the adapter, whereby the fuel jet discharged from port 59 of nozzle tip 58 passes through the inner port 64 as indicated by the line 67 and impinges on the wall of bore 63 at substantially the locus indicated at 68. The comparatively solid fuel jet of rather high intensity as produced by nozzle 33 is thereby deflected in the form of a highly atomized soft spray of low intensity which passes through the outer port 65 into the combustion space as indicated at 69. The outward flare of the fuel impingement passage 63 is so coordinated with other constructional features including the positioning of the nozzle tip and the center line or directional axis of the fuel jet from the nozzle that the deflected soft spray 69 passes into the combustion space 20 without substantial reimpingement on the wall of the fuel passage.

As shown more particularly in Fig. 4, the fuel nozzle socket portions 54 and 57 of the adapter are drilled at an angle to the central axis of the adapter, as indicated by the included angle 70. The maximum angular inclination of the socket portions to the axis of the adapter is at substantially right angles to the maximum angular inclination of the fuel passage 63 to the axis of the adapter, as will be evident from Figs. 3 and 4. When the adapter is properly mounted in place within bore 30, the outer port 65 in end wall 53 will be positioned substantially as shown in Fig. 2 somewhat above the horizontal center line of bore 30. Most of the angular inclination of fuel passage 63 is directed in the horizontal plane of Fig. 1 toward the locus of spark ignition, but a portion of this angular inclination is directed upwardly as shown in Fig. 2. At the same time, most of the angular inclination of the socket portions 54—57 is directed upwardly in the vertical plane of Fig. 2, so that impingement results in a slight upward tilt to the spray form. The deflected spray thus passes into the combustion space in a generally tangential direction thereof as viewed in the horizontal plane of Fig. 1, but is also slightly inclined upwardly as viewed in the vertical plane of Fig. 2. The net result is the production of a fan-shaped spray as viewed in Fig. 1 located at one side of the combustion space near the wall thereof but avoiding direct impingement of liquid fuel particles on the wall, and being of sufficiently low intensity such that the fuel does not travel across the combustion space to impinge on the far wall in liquid form. At the same time, the spray form is flattened as viewed in the vertical plane of Fig. 2 and directed somewhat upwardly so that the outer surface thereof just misses the electrodes 27 of the spark plug.

The end wall 53 is in a position to receive heat of combustion from the combustion space, and to store that heat since the adapter is not directly contacted by the cooling water within the water jacket 11. However, since the adapter is preferably of high heat conductivity, this heat is taken up in substantial part by the fuel which impinges on the fuel passage 63 so that the fuel is simultaneously heated to promote rapid vaporization as it is converted by impingement into the soft atomized spray. This produces a spray whose outer surface is in the form of a very fine mist which is almost immediately converted into vapor as it passes into the combustion space.

In operation on the four-stroke cycle, air or dilute fuel-air mixture which is too lean to support combustion is drawn on the suction stroke of piston 12 through intake port 14 and through the tangential port formed by shroud 21 so as to impart a high velocity of swirling movement to the air within the cylinder. This air or dilute mixture is then compressed on the compression stroke of the piston. The injection advance is set so that the start of fuel injection occurs on each cycle from about 75° before top dead center to about 20° after top dead center, and preferably about 50-20° before top dead center, of the compression stroke. The fuel is injected from nozzle 33 against the impingement member 32 and is deflected into the combustion space. This is indicated more clearly in Figs. 3 and 5 where the soft spray is shown at 69. The outer edge of this spray which vaporizes rapidly is mixed with the swirling air, and is at the same time diffused as indicated at 70 toward the circumference of the combustion space and into direct contact with the electrodes 27 of spark plug 26. In this manner direct impingement of liquid fuel particles on the electrodes is avoided so that misfiring and damping out of the plug is prevented. However, the combustible fuel vapor-air mixture rapidly formed from the mixing of the swirling air with the outer edge of the vaporized fuel mist is brought directly into contact with these electrodes.

The spark timing is synchronized with the injection advance in a manner described in greater detail hereinbelow, so that a spark of igniting intensity is present at the electrodes at the time the first increment of injected fuel in the form of combustible fuel vapor-air mixture reaches those electrodes. This insures ignition and establishes a flame front indicated at 71. The heat of combustion causes rapid expansion of the mixture and burning proceeds inwardly toward the center of the combustion space, producing a zone of combustion indicated by the cross-hatched portion 72 of Fig. 5. While the combustion zone 72 is shown for clearness in illustration as being of appreciable width, it is to be understood that the region of active burning may be confined substantially to a curved line 71 of the flame front and not have the width indicated.

The spark plug 26 is spaced from the locus of injection a sufficient distance to permit the formation of the combustible fuel vapor-air mixture during the intervening travel of the injected fuel, while at the same time the plug 26 is sufficiently close to the locus of injection to prevent the accumulation within the combustion space of any substantial amount of combustible mixture prior to ignition. In the particular arrangement shown, employing a cylinder having a bore diameter of 3¼ inches, good results have been secured with an inclined angle 31 of about 30-90° and preferably about 30-45° between the radii passing through the electrodes 27 and the locus of injection 65 respectively. It is to be understood that the spray pattern, fuel intensity of the jet, and the velocity of air swirl may be altered and correlated for different spacings of the plug and adapter in order to obtain the desired knock-free operation. In general, it can be stated that the included angle 31 should be greater than about 20° and less than about 135°.

It will be understood that the angular inclinations of the fuel passage 63 and the nozzle socket 54—57 can be altered to suit the particular relationships of spacing of the adapter and plug, the cylinder diameter and the velocity of air swirl, so that the proper type of spray pattern is formed for each relationship. Moreover, in some cases, the required angular relationship between the directional axis of fuel injection from the nozzle and the directional axis of the spray form resulting from impingement can be produced by proper inclination of the fuel passage 63 alone, instead of the combination of the nozzle socket inclination and the fuel passage inclination as shown. In this manner a standard and conventional type of fuel injection nozzle and a standard cylinder equipped with radially drilled bores can be readily converted to the present method of operation for knock-free combustion.

During the continuance of that portion of the compression or combustion stroke or both, which falls within the period of fuel injection, additional fuel is injected toward the flame front 71 and is mixed with fresh quantities of the swirling air to form combustible fuel vapor-air mixture that is ignited and burned as it reaches the flame front. It will be noted that the flame front tends to travel toward the locus of fuel injection; but the high swirling movement of the air and other gases within the combustion, coupled with the fact that the mixture within the diffused spray 69 is incombustibly rich, tends to counteract actual relative movement of the flame front with respect to the cylinder wall, so that the flame front may remain comparatively stationary or in a fixed location with respect to the cylinder wall, ignition plug, and adapter.

The combination of the additional fuel-air mixture takes place almost as rapidly as formed, so that no opportunity is given for unburned fuel to become disseminated widely throughout the combustion space. The first portions of fuel-air mixture, which were rapidly burned in zone 72, become incombustible exhaust gases which continue the swirling movement around the cylinder as indicated at 73. Following the power stroke, the exhaust gases are discharged through the port 17 on the exhaust stroke of the piston, and the cycle is then repeated.

While the spark plug is shown mounted with the electrodes 27 at the circumference of the combustion space and at the upper end thereof, it should be pointed out that the plug can be mounted in other positions with an adapter correlated to produce a proper spray pattern for the particular location chosen. For example, the electrodes may be located about ½" to 1" from the circumference of the combustion space, and the elevation of the electrodes may be shifted to bring them down to or below the horizontal plane of the locus of injection.

However, in order to efficiently consume the air within the combustion space to provide maximum power and high thermal efficiency on each cycle, the spray pattern should be designed to uniformly impregnate the air in its swirling movement. This requires a greater proportion of fuel toward the circumference of the combustion space with progressively lesser proportions toward the center. Such uniform impregnation is accomplished in the construction shown by arranging the fan-shaped spray to one side of the combustion space, so that the outer edge of the fan is close to but does not impinge directly against the cylinder wall, while the inner edge of the fan is off-set from the center of the combustion space. The expansion of the products of combustion then causes sufficient movement of vaporized fuel toward the center to effect the desired impregnation of the lesser amount of air in this region. With the particular construction shown, including the 180° shroud producing a given velocity of air swirl, and the relative positioning of the adapter and spark plug, region 1 of Fig. 5 indicates the zone into which the fuel spray was injected for efficient knock-free operation of the present invention; while region 2 indicates the zone in which knocking would occur when the fuel was injected in substantial amount in that region. Since the outer edge of the spray pattern should be close to but spaced slightly from the plug electrodes, so that liquid fuel particles do not directly impinge on the electrodes, the positioning of the plug in the particular construction shown is preferably close to the circumference of the combustion space, so that the desired spray pattern can be utilized to uniformly impregnate the swirling air across a radius of the combustion space, and at the same time combustible fuel vapor-air mixture diffuses into contact with the electrodes. While the plug electrodes can be positioned adjacent the inner edge of the fan-shaped spray, that is the edge closer to the center of the combustion space, this requires more critical correlation of the positioning of the electrodes with respect to the spray pattern, since the swirling air then tends to blow the formed fuel vapor away from the electrodes. Consequently, the outer positioning of the electrodes in the arrangement shown is preferred. Moreover, the outer edge of the spray pattern can miss the electrodes by a larger amount and the swirling air then relied on to blow or carry the formed fuel vapor into contact with the electrodes for proper ignition.

While the adapter construction shown, which is designed to deflect the spray in the direction of the swirling air, is preferred, other arrangements can be employed. For example, the fuel may be deflected across the air swirl or against the air swirl. Such modifications require a proper correlation of the fuel injection rate and spray pattern with the velocity of air swirl, the cylinder diameter, and the relative positioning of the adapter and spark plug in accordance with the general principles set forth above.

While the present invention can be operated with a substantially instantaneous spark at the plug electrodes, this requires a critical coordination of the spark advance with the injection advance. For example, in the construction shown in the drawings employing injection in the direction of air swirl, the instantaneous spark should occur at the plug electrodes at an instant within the range of about 4-10° and preferably about 6° of crank angle movement following the start of fuel injection. Where the injection is across or against the air swirl, then the spark advance is usually within the range of about 10–20° after the injection advance for the instantaneous spark.

However, it has been found that the conventional magneto ignition system has a spark duration of about 5–30 crank angle degrees at an engine speed of 1800 R. P. M. While not all of this spark duration may be of sufficient intensity to ignite the mixture, a considerable spark tolerance is provided and varies with the particular circuit and the size of the spark gap employed. In general, such conventional automotive ignition circuits of the magneto type will afford a spark tolerance of about 5–15°, such that the spark advance may be set to precede the start of injection by as much as about 5–10°, while the full retard setting of the spark advance may be as much as 7° or more after the start of fuel injection. The proper setting for any particular ignition circuit for a given engine construction can be readily determined by those skilled in the art in accordance with the principles set forth above, bearing in mind that a spark of ignitible intensity should be present at the plug electrodes at the time the first increment of injected fuel in the form of combustible fuel vapor-air mixture reaches the plug electrodes. Moreover, a continuous spark or semi-continuous spark which stays on for a predetermined portion of the cycle can be employed.

While the invention has been described above as applied to four-cycle operation, it is to be understood that the invention is also applicable to two-cycle operation. For example, a two-cycle engine may be equipped with air intake ports for directional introduction of the air just above the bottom of piston travel, whereby a swirling movement of the air can be imparted, and the fuel injected into the compressed swirling air and ignited in the manner described above. While the invention in its simplest form dispenses with the conventional carburetors and manifolds of present-day engines, it is to be understood that a system of carburetion can also be employed in conjunction with the fuel injection system of the present invention, provided the initial carbureted fuel vapor-air mixture drawn into the engine cylinder contains insufficient fuel to support combustion or to be spark-ignited. Moreover, while the air drawn into the cylinder on each cycle is preferably unthrottled, the invention is applicable to an engine operating with throttling of the air on each cycle in accordance with the power required.

By way of specific example, very satisfactory operation in accordance with the present invention has been secured with a conventional CFR engine equipped with a multi-port cylinder, by mounting the spark plug 26 in the conventional hot plug port, and the adapter of the present invention in the conventional accessory or microphone port. This provided the construction illustrated, wherein the included angle 31 was approximately 30°. The intake valve 15 was equipped with a 180° shroud as shown. The adapter was constructed from brass stock which was drilled and tapped to provide a socket 54—57 for the injection nozzle, the axis of the socket having about an 8–9° angle to the vertical center line of the adapter. A cam-operated fuel pump having a 6 mm. pump plunger controlled the supply of fuel to a standard Bosch injection nozzle having a zero cone angle mounted in the adapter, so that the fuel discharge port of the nozzle tip was immediately behind the inside of the end wall 53. The adapter was further drilled to provide the flaring fuel passage 63, having a port 64 of about 1/32 of an inch diameter at the inner end and flaring outwardly at a 20° included angle to give an opening 65 of about 3/8" diameter at its outer end. The said flaring fuel passage was inclined at an angle of about 20° to the vertical axis of the adapter.

The said adapter was mounted in the bore 30 of the CFR engine so that the axis of the flaring fuel passage 63 in the horizontal plane of Fig. 1 extended at an acute angle to the radius of the combustion space in the general direction of the spark plug electrodes, and extended in the vertical plane of Fig. 2 at a smaller angle upwardly toward the head of the cylinder, so that the center of port 65 was approximately 1/4" above the horizontal center line of bore 30. This construction produced the soft fan-shaped and flattened fuel spray 69 as shown in Figs. 1 and 2, and gave very satisfactory knock-free combustion at compression ratios as high as 10:1 with manifold pressures as high as 112" of mercury absolute with fuels from 0 to 100 CFRM octane.

Obviously many modifications and variations of the invention, as hereinbefore set forth, may be made without departing from the spirit and scope thereof, and only such limitations should be imposed as are indicated in the appended claims.

I claim:

1. An adapter for a fuel-injection nozzle to be used in an internal combustion engine of the character described, comprising a heat absorbing member having an extension adapted to be mounted in tight engagement within an opening through the wall of the internal combustion engine cylinder to receive heat from the cylinder combustion space, and a body portion having a socket adapted to receive said fuel injection nozzle in tight engagement with the tip of said nozzle located within the adapter rearwardly of the end of said extension, said adapter having a bore opening at the inner end thereof in alignment with said nozzle tip when positioned within said socket, and extending through said extension to form a fuel discharge port adapted to open into the combustion space when said adapter is mounted within said cylinder opening, the axis of said bore being inclined with respect to the axis of fuel injection from said nozzle at an angle so that a fuel jet from said nozzle is adapted to impinge on the wall of said bore and be deflected in the form of a soft spray of low intensity through said discharge port into the combustion space.

2. An adapter according to claim 1, wherein the said bore flares outwardly from a relatively smaller port at the inner end thereof to a relatively larger port constituting said fuel discharge port, said flare and said angular inclination being such as to prevent any substantial reimpingement of the deflected soft spray on the bore wall of said adapter.

3. An adapter according to claim 1, wherein the central axis of said socket adapted to receive the fuel injection nozzle is inclined with respect to the central axis of said extension which is adapted to be received within said cylinder opening, the said axis of the bore also being inclined with respect to said central axis of the extension.

4. An adapter for a fuel injection nozzle to be used in an internal combustion engine and having a tip with a fuel injection port and an externally threaded portion rearwardly of said tip, comprising a member having a body of larger diameter and an externally threaded extension of smaller diameter adapted to be received in gas tight relationship within a threaded opening in the wall of a cylinder of said internal combustion engine, said extension having a wall at the end thereof, an external shoulder between said body and said extension adapted to limit threaded movement of said adapter into said cylinder opening so that the end of said extension wall is substantially flush with the wall of the combustion space of said cylinder, said adapter having a socket formed with an internally threaded portion of large diameter formed in the body portion adapted to receive the externally threaded portion of the nozzle in gas tight relationship, and a smaller diameter portion formed within the said extension adapted to receive the nozzle tip, an internal shoulder between said socket portions adapted to limit threaded engagement of said nozzle into the said adapter socket so that the said injection port of the nozzle tip is positioned near but behind the said end wall of said extension, said end wall having a fuel passage extending therethrough, the inner end of said passage being adapted to be directly opposite the said injection port of the nozzle tip and the outer end of said passage being adapted to open into the combustion space of said cylinder, the axis of said fuel passage being inclined to the longitudinal axis of the nozzle when positioned within said socket and consequently inclined to the direction of fuel injection from said nozzle, whereby the fuel jet from said nozzle is adapted to impinge on the wall of said fuel passage and be deflected in the form of a soft spray of low intensity into the cylinder combustion space.

5. An adapter in accordance with claim 4, wherein the said fuel passage flares outwardly from an opening of smaller diameter at the inner end adjacent the nozzle tip position to an opening of larger diameter at the outer end which is adapted to face the cylinder combustion space, the extent of said flare being coordinated with the said inclination thereof such that reimpingement of deflected fuel spray on the wall of said fuel passage is substantially avoided.

6. An adapter in accordance with claim 4, wherein the central axis of the said socket is inclined to the central axis of the adapter body and extension, and the axis of the fuel passage is also inclined to the central axis of the adapter body and extension.

7. In an internal combustion engine of the character described having a power cylinder providing a combustion space, and a spark plug having electrodes positioned within said combustion space; the combination of an impingement and heat absorbing member of high heat conductivity mounted in an opening through said cylinder wall adjacent said spark plug electrodes and so that the inner end wall of said member is substantially flush with the wall of said combustion space, said member having an outwardly opening socket, a fuel injection nozzle mounted within said socket with the nozzle tip behind said inner end wall, said member having a flaring bore through said end wall, the smaller end of said bore being in alignment with said nozzle tip and the larger end of said bore opening into the combustion space, and said bore being angularly inclined with respect to the longitudinal axis of injection from said nozzle tip and toward said spark plug electrodes, whereby the fuel jet from said nozzle tip impinges on the flaring bore wall and is thereby heated and deflected into the said combustion space in the form of a highly atomized spray of low intensity, the relative positioning of said member and spark plug electrodes and the angular inclination of said flaring bore being correlated so that an outer edge of said spray form passes close to said spark plug electrodes without direct impingement of liquid fuel thereon and combustible fuel vapor-air mixture rapidly formed along said outer edge moves into contact with said electrodes.

8. The combination according to claim 7, wherein the fuel injection nozzle tip has a substantially zero cone angle, and the flare of the said bore is correlated to substantially avoid reimpingement of the deflected spray on the bore wall.

JAY B. MALIN.